（12） United States Patent
Huang et al.

(10) Patent No.: US 9,942,920 B2
(45) Date of Patent: *Apr. 10, 2018

(54) TRIGGER FRAME RESPONSE WITH NETWORK ALLOCATION VECTOR

(71) Applicant: Intel IP Corporation, Santa Clara, CA (US)

(72) Inventors: Po-Kai Huang, West Lafayette, IN (US); Robert J. Stacey, Portland, OR (US); Qinghua Li, San Ramon, CA (US)

(73) Assignee: Intel IP Corporation, Santa Clara, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 14/977,417

(22) Filed: Dec. 21, 2015

(65) Prior Publication Data

US 2017/0006635 A1    Jan. 5, 2017

Related U.S. Application Data

(60) Provisional application No. 62/187,569, filed on Jul. 1, 2015, provisional application No. 62/204,720, filed on Aug. 13, 2015.

(51) Int. Cl.
*H04W 74/08*  (2009.01)
*H04B 7/0452*  (2017.01)
*H04L 5/00*  (2006.01)
*H04W 84/12*  (2009.01)

(52) U.S. Cl.
CPC ...... *H04W 74/0816* (2013.01); *H04B 7/0452* (2013.01); *H04L 5/0007* (2013.01); *H04W 84/12* (2013.01)

(58) Field of Classification Search
CPC ............... H04B 7/0452; H04L 5/0007; H04W 74/0816; H04W 84/12; H04W 74/08; H04W 72/0473
See application file for complete search history.

(56) References Cited

U.S. PATENT DOCUMENTS 7,161,951 B1 * 1/2007 Sherman ............. H04W 74/008 370/447
8,837,478 B1 * 9/2014 Nemavat ............. H04L 12/1868 370/255
9,100,154 B1 * 8/2015 Jeffery ................... H04L 5/005
(Continued)

*Primary Examiner* — Mohamed Kamara
(74) *Attorney, Agent, or Firm* — Schwegman Lundberg & Woessner, P.A.

(57) ABSTRACT

Computer readable media, methods, and apparatuses to determine whether to respond to a frame based on a network allocation vector. An apparatus of a station comprising memory and processing circuitry coupled to the memory is disclosed. The processing circuitry is configured to: decode a frame comprising a first duration and a first transmitter address, if the frame is a trigger frame or a multi-user request-to-send (MU-RTS) frame from a master station of a basic service set (BSS), respond to the trigger frame or the MU-RTS frame if the trigger frame or MU-RTS frame comprises a NAV indicator that indicates not to consider a network allocation vector (NAV). The indication may be an indication in a physical header or an indication in a media access control header.

22 Claims, 11 Drawing Sheets

(56) References Cited

U.S. PATENT DOCUMENTS

| | | | |
|---|---|---|---|
| 2005/0141545 A1* | 6/2005 | Fein | H04B 7/0617 370/445 |
| 2010/0309871 A1* | 12/2010 | Fischer | H04L 5/0023 370/329 |
| 2012/0147804 A1* | 6/2012 | Hedayat | H04W 74/0816 370/312 |
| 2012/0236840 A1* | 9/2012 | Kim | H04W 74/0816 370/338 |
| 2013/0070668 A1* | 3/2013 | Merlin | H04W 74/0816 370/328 |
| 2014/0119288 A1* | 5/2014 | Zhu | H04W 74/0816 370/329 |
| 2015/0063251 A1* | 3/2015 | Asterjadhi | H04W 74/04 370/329 |
| 2016/0014725 A1* | 1/2016 | Yu | H04W 72/0453 370/329 |
| 2016/0029357 A1* | 1/2016 | Lv | H04W 72/04 370/235 |

* cited by examiner

TRIGGER FRAME RESPONSE WITH NETWORK ALLOCATION VECTOR

PRIORITY CLAIM

This application claims the benefit of priority under 35 USC 119(e) to United States Provisional Patent Application Ser. No. 62/204,720, filed Aug. 13, 2015, and to U.S. Provisional Patent Application Ser. No. 62/187,569, filed Jul. 1, 2015, both of which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to setting network allocation vectors (NAVs) and determining whether to respond to frames when the NAV is set. Some embodiments relate to trigger frames.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

Thus, there are general needs for improved methods, apparatuses, and computer readable media for centralized channel access for primary and secondary channels.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
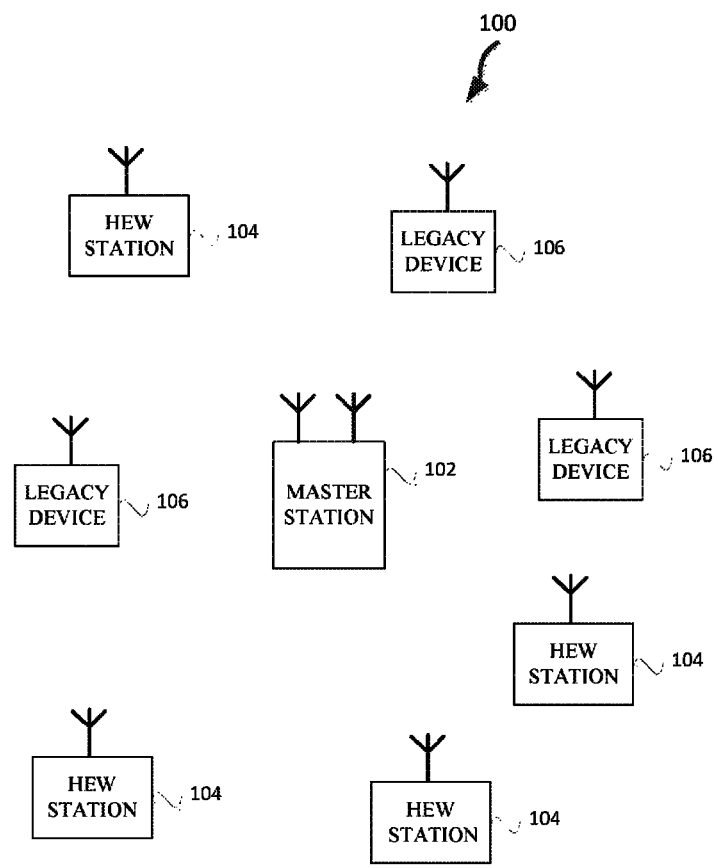
FIG. 1 illustrates a wireless network in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) stations 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The legacy devices 106 may operate in accordance with one or more of IEEE 802.11 a/b/g/n/ac/ad/af/ah/aj, or another legacy wireless communication standard. The legacy devices 106 may be STAs or IEEE STAs. The HEW stations 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW stations 104 may be termed high efficiency (HE) stations.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques.

In some embodiments, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HEW frame may be configured for transmitting a number of spatial streams, which may be in accordance with MU-MIMO. In other embodiments, the master station 102 HEW station 104, and/or legacy device 106 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW stations 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating.

In accordance with some embodiments, during the master-sync transmission the HEW stations 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA control period.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the HEW stations 104 and/or the master station 102 are configured to perform the methods and functions herein described in conjunction with FIGS. 1-11.

Figure 2:
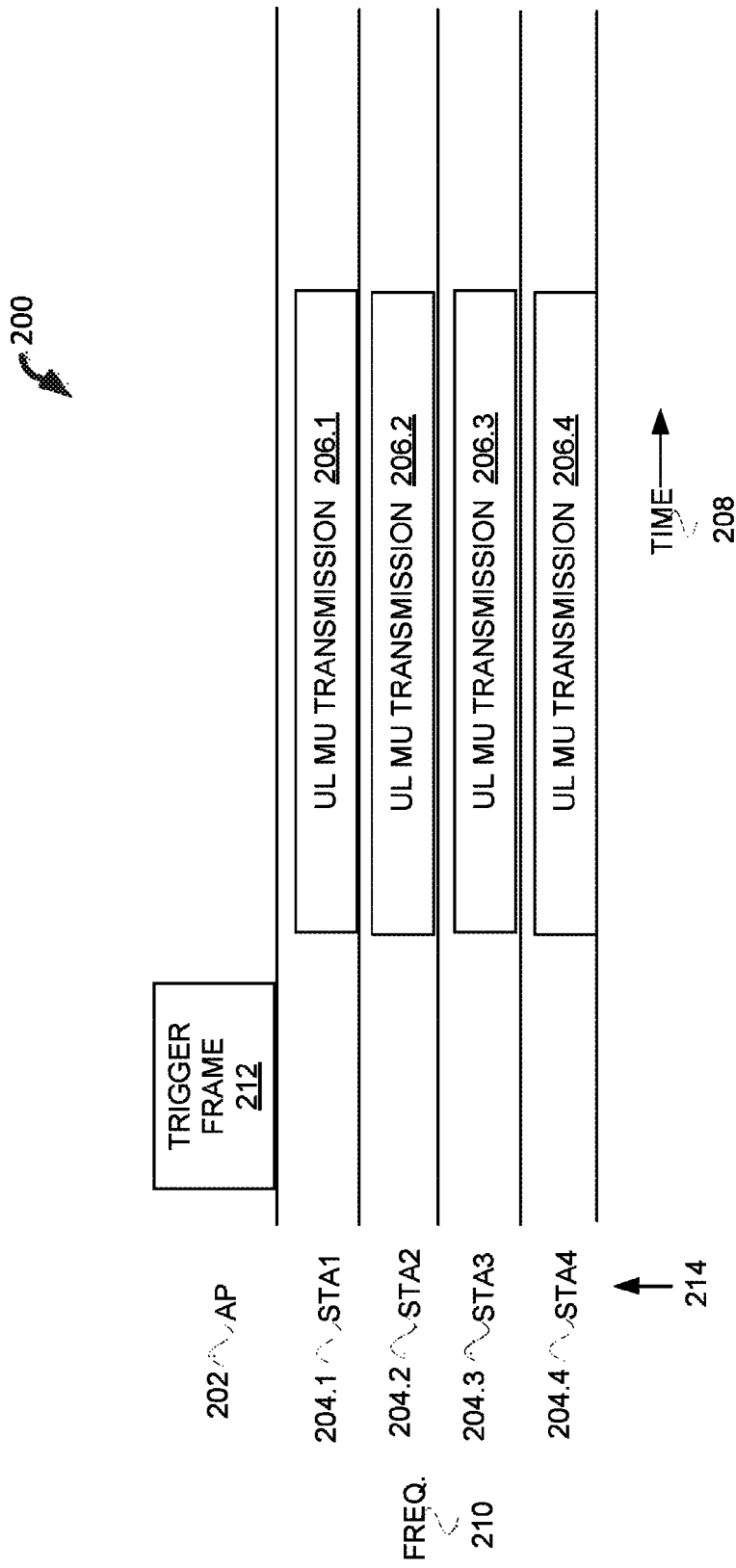
FIG. 2 illustrates a transmission opportunity (TXOP) in accordance with some embodiments.

FIG. 2 illustrates a transmission opportunity (TXOP) 200 in accordance with some embodiments. Illustrated in FIG. 2 is time 208 along a horizontal axis, frequency 210 along a vertical axis, and the transmitter 214 along the vertical axis. The AP 202 may be a master station 102. The STAs 204 may be HEW stations 104. The TXOP 200 may be triggered by the trigger frame 212 transmitted by the AP 202. The trigger frame 212 may include a resource allocation for the stations STA1 204.1, STA2 204.2, STA3 204.3, and STA4 204.4. In some embodiments, resource allocations for the STAs 204 may have been transmitted to the STAs 204 in a previous transmission. The trigger frame 212 may be a frame that indicates that the STAs 204 should begin MU UL transmission. The STAs 204 may after waiting a duration (e.g, interframe space) transmit the UL MU transmissions 206 in accordance with the resource allocations. For example, each of the STAs 204 may transmit on a 20 MHz channel or a 2.03 MHz channel. The TXOP 200 may include other transmissions.

Figure 3:
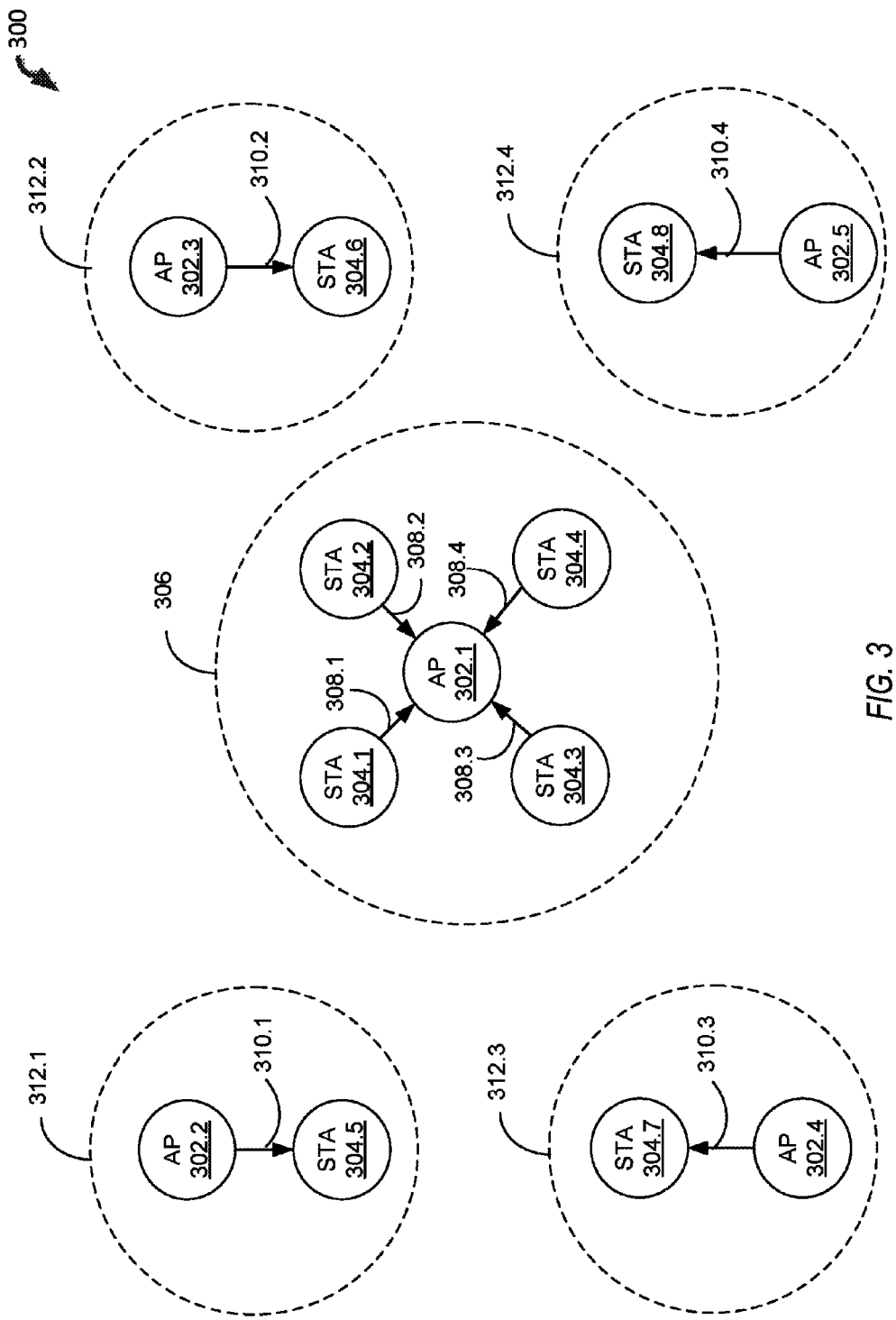
FIG. 3 illustrates a system of basic service sets (BSSs) and overlapping BSSs (OBSSs) in accordance with some embodiments.

FIG. 3 illustrates a system 300 of basic service sets (BSSs) and overlapping BSSs (OBSSs) in accordance with some embodiments. Illustrated in FIG. 3 is APs 302, STAs 304, uplink (UL) multi-user (MU) transmissions (UL MU transmissions) 308, overlapping BSSs (OBSSs) 312, OBSS downlink (DL) transmissions 310, and BSS 306. The AP 302 may be master stations 102. The STAs 304 may be HEW stations 104. The BSS 306 may be a BSS as disclosed in conjunction with FIG. 1. UL MU transmissions 308 may be UL MU transmissions 206 as disclosed in conjunction with FIG. 2. The OBSS 312 may be OBSSs as disclosed in conjunction with FIG. 1. The OBSS transmissions 310 may be DL transmissions from the APs 302 to the STAs 304 in the OBSSs 312.

As illustrated in FIG. 3, the AP 302.1 triggers STAs 304.1, 304.2, 304.3, and 304.4 for UL MU transmissions 308 in a TXOP. For example, AP 302.1 may trigger STAs 304.1, 304.2, 304.3, and 304.4 as the AP 202 triggers STAs 204.1, 204.2, 204.3, and 204.4 disclosed in conjunction with FIG. 2.

Each UL MU transmission 308 may interfere with an OBSS DL transmission 310 if a network allocation vector (NAV) of the STA 304 is set. For example, UL MU transmission 308.1 transmitted by STA 304.1 may interfere with OBSS DL transmission 310.1. For the purposes of the calculations determined in conjunction with FIG. 3, APs 302 do not receive or recognize transmissions from other APs 302. Each STA 304 has a NAV. The NAV may be set by the OBSS DL transmission 310.1. If the STA 304.1 ignores the NAV and transmits the UL MU transmission 308.1, then the UL MU transmission 308.1 may interfere with the OBSS DL transmission 310.1.

The following is for calculations of a throughput for the system 300. TXOP duration=T for BSS 306 and OBSS 312. The transmission rate for OBSS DL transmission 310 is M and the UL MU transmissions 308 transmission rate is M/4. If STAs 304.1, 304.2, 304.3, and 304.4 transmit UL MU transmissions 308 without considering the NAV then the following may be a throughput of the system 300. BSS throughput is (of BSS 306)=M/4*T for 4*(M/4*T)=M*T. For each STA 304 of BSS 306 assume the NAV is set with probability of p. For a first case, assume that when the NAV is set and the STA 304 transmits anyway that, on average, the UL MU transmission 308 disrupts half of the OBSS DL transmissions 310. The OBSS throughput=C(4,1)*p*(1−p)^3*M*T/2+C(4,2)p^2(1−p)^2*M*T+C(4,3)p^3(1−p)

*3*M*T/2+C(4,4)*p^4*2*NPT, where C(x,y) stands for the number of combinations of X choose Y, e.g., C(4, 1)=4, C(4,2)=6, etc.

$$\text{TotalNoNAVthroughput} = \text{BSS throughput} + \text{OBSS throughput}. \quad \text{Equation (1):}$$

For a second case, assume STAs 304 of BSS 306 consider the NAV. The BSS throughput (of one TXOP for BSS 306)=C(4,0)(1−p)^4*M*T+C(4,1)*p*(1−p)^3*M*T/4+C(4, 2)*p^2*(1−p)^2*2*M*T/4+C(4,3)*p^3*(1−p)*M*T/4, and the OBSS throughput=C(4,1)*p*(1−p)^3*M*T+C(4,2) *p^2*(1−p)^2*2*M*T+C(4,3)*p^3*(1−p)*3*M*T+C(4,4) *p^4*4*M*T.

$$\text{TotalNAVthrougput} = \text{BSS throughput} + \text{OBSS throughput}. \quad \text{Equation (2):}$$

Figure 4:
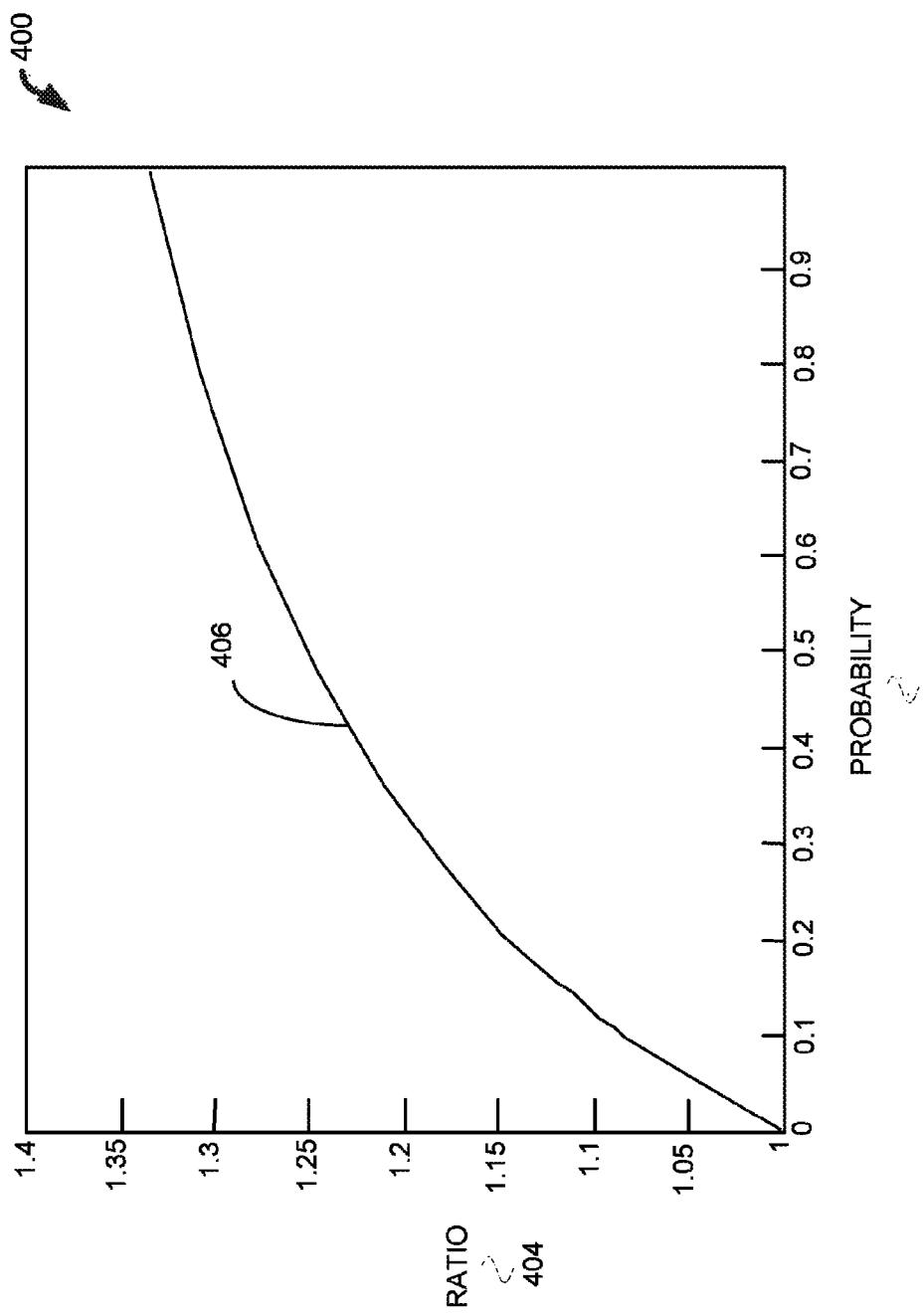
FIG. 4 illustrates the ratio of Equation 2 to Equation 1 in accordance with some embodiments.

FIG. 4 illustrates the ratio of Equation 2 to Equation 1 in accordance with some embodiments. Illustrated in FIG. 4 is the probability 402 of the NAV being set of a BSS 306 STA along a horizontal axis and the ratio 404 of Equation 2 divided by Equation 1 along a vertical axis.

As can be seen in FIG. 4, the ratio of Equation 2 divided by Equation 1 is always greater than 1. So, the Equation 2 is always greater than Equation 1. Therefore, it is always better given the assumptions of the example for the STAs 304 of BSS 306 to consider the NAV before transmitting the UL MU transmissions 308.

Figure 5:
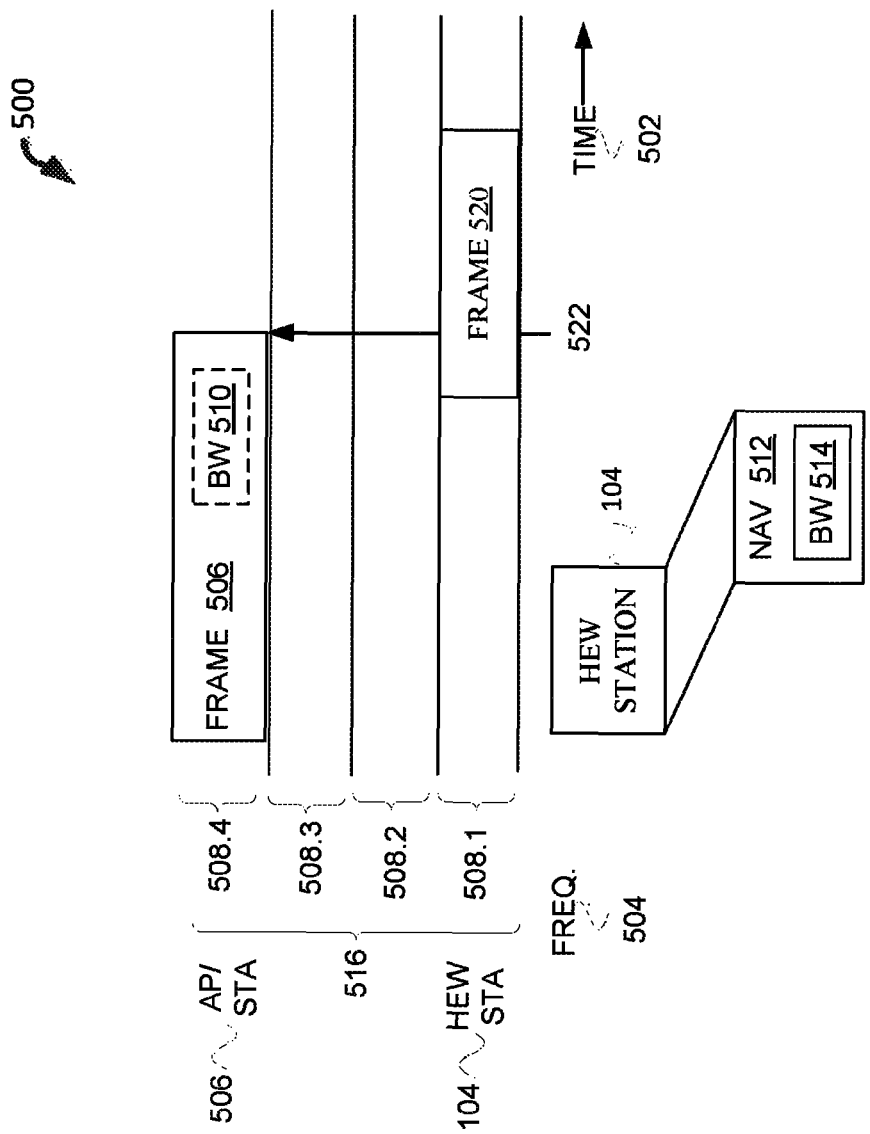
FIG. 5 illustrates a method of setting a NAV in accordance with some embodiments.

FIG. 5 illustrates a method 500 of setting a NAV in accordance with some embodiments. Illustrated in FIG. 5 is time 502 along a horizontal axis, frequency 504 along a vertical axis, an AP/STA 506 transmitting a frame 506, and a HEW station 104 receiving the frame 506. The frequency 504 may have a full bandwidth 516 and may be divided into subchannels 508. For example, the full bandwidth 516 may be 80 MHz and the subchannels 508 may be 20 MHz. A different number of subchannels 508 may be used as well as different bandwidths for the full bandwidth and subchannel bandwidths.

The method 500 may begin with the AP/STA 506 transmitted frame 506. Frame 506 may be transmitted in one or more subchannels 508 or the full bandwidth 516. The frame 506 may include a bandwidth 510 which indicates a bandwidth for the receiver to set a NAV for.

The HEW station 104 may receive the frame 506 and determine to set a NAV 512 with the BW 514 of BW 510. The frame 506 may not include a BW 510 in which case the HEW station 104 may determine the bandwidth 514 based on the bandwidth of the frame 506 is transmitted on. For example, the HEW station 104 may determine the bandwidth 514 is the entire bandwidth occupied by a trigger frame or a MU-RTS frame. If the HEW station 104 cannot determine the bandwidth the HEW station 104 may set the BW 514 to the full bandwidth 516. The BW 510 may be in a PHY header or MAC header.

The method 500 may continue with the HEW station 104 transmitting the frame 520 on subchannel 508.1. For example, the NAV 512 may be set to time 522, but the HEW station 104 may check the BW 514 and determine that frame 520 transmitted on subchannel 508.1 will not interfere with frame 506 transmitted on subchannel 508.4. The HEW station 104 may transmit frame 520 in response to a TXOP initiated by a master station 102. If the HEW station 104 cannot determine the bandwidth of the frame 506, then the HEW station 104 may defer until after time 522 when the NAV 512 is no longer set.

Figure 6:
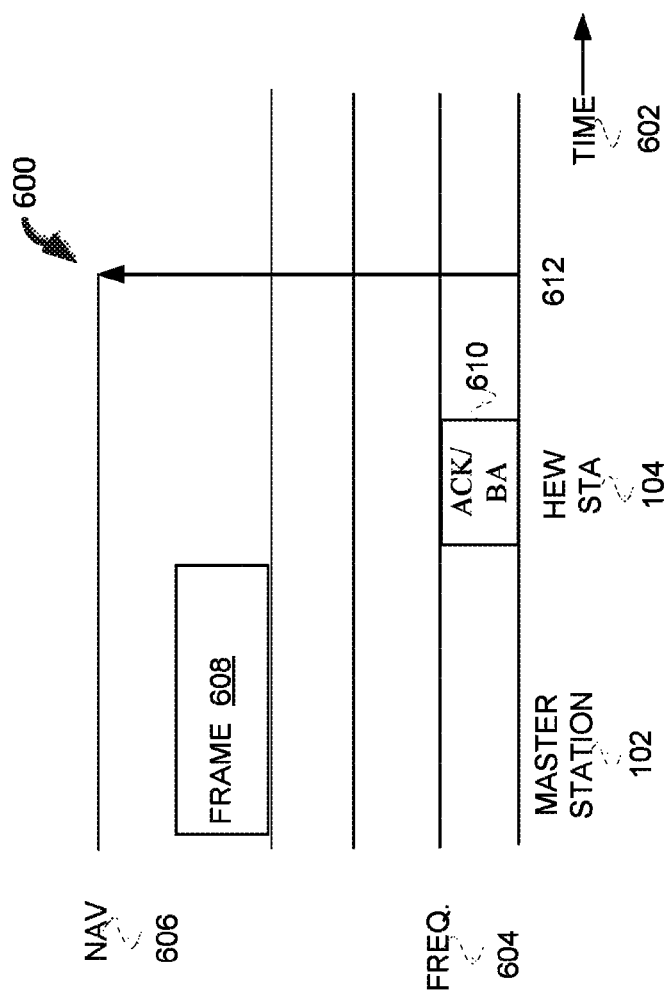
FIG. 6 illustrates a method of setting a NAV in accordance with some embodiments.

FIG. 6 illustrates a method 600 of setting a NAV in accordance with some embodiments. Illustrated in FIG. 6 is time 602 along a horizontal axis, frequency 604 along a vertical axis, NAV 606 of the HEW STA 104, frame 608, ACK/BA 610, master station 102, and HEW STA 104.

The method 600 may begin with a master station 102 transmitting frame 608. Frame 608 may be DL data to HEW STA 104 or may be a polling frame for an acknowledgment (ACK) or block ACK (BA) from the HEW station 104. The HEW station 104 may already have a NAV 606 set to time 612 from another transmission such as an OBSS transmission. The HEW station 104 may determine to transmit the ACK/BA 610 despite the NAV 606 being set. The HEW station 104 may terminate the ACK/BA 610 early. The transmission of the ACK/BA 610 may prevent the master station 102 from having to retransmit the frames the ACK/BA 610 is acknowledging.

Figure 7:
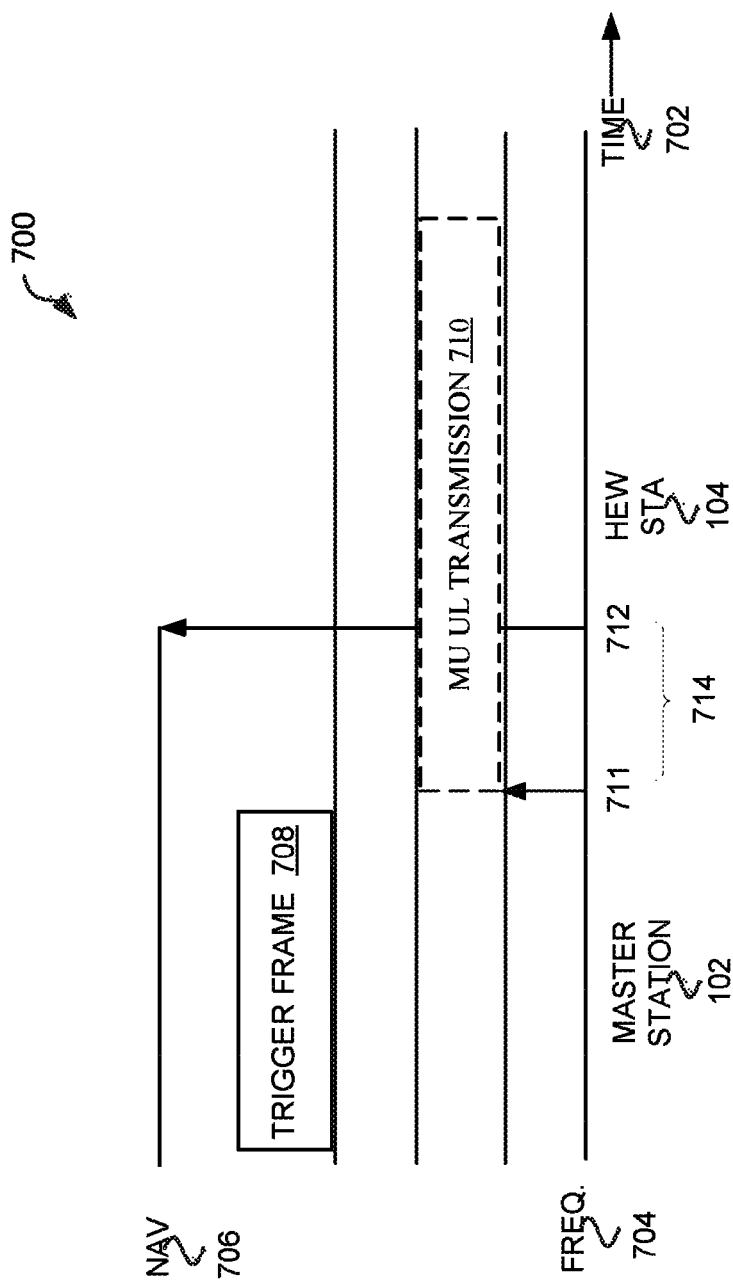
FIG. 7 illustrates a method of setting a NAV in accordance with some embodiments.

FIG. 7 illustrates a method 700 of setting a NAV in accordance with some embodiments. Illustrated in FIG. 7 is time 702 along a horizontal axis, frequency 704 along a vertical axis, NAV 706 of the HEW STA 104, trigger frame 708, MU UL transmission 710, master station 102, and HEW STA 104.

The method 700 may begin with the master station 102 transmitting a trigger frame 708. The trigger frame 708 may indicate to the HEW station 104 that it is to transmit in accordance with a recourse allocation which may be represented by the MU UL transmission 710. The NAV 706 of the HEW station 104 may be set by a previous frame, e.g. an OBSS transmission. The HEW station 104 may determine whether or not to transmit the MU UL transmission 710 based on an overlapping duration 714 of when the NAV 706 will end 712 and when the MU transmission 710 is to start 711. The HEW station 104 may determine whether or not to transmit based on duration of the overlapping duration 714. The HEW station 104 may compare the overlapping duration 714 to a threshold which may be sent by the master station 102 or predefined. The HEW station 104 may determine a throughput by considering the product of occupied bandwidth of NAV and the NAV duration with the product of allocated bandwidth for the MU UL transmission 710 and the MU UL transmission 710 duration. In some embodiments, the MU UL transmission 710 may be a single user (SU) transmission. In some embodiments, the NAV 706 includes an associated BW 512 (see FIG. 5). The throughput determination may be based on the BW 512 and the bandwidth of the MU UL transmission 710.

Figure 8:
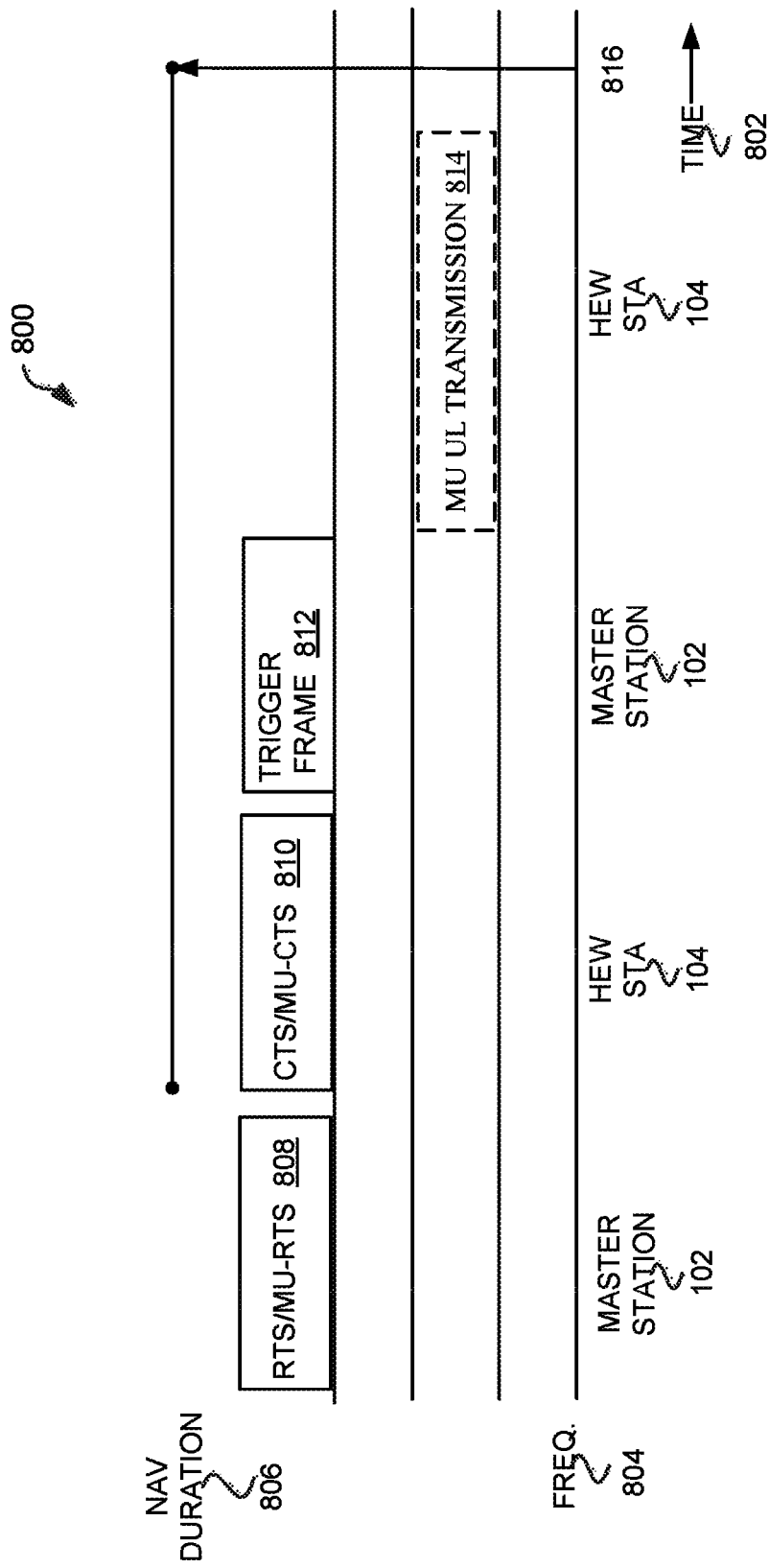
FIG. 8 illustrates a method of setting a NAV in accordance with some embodiments.

FIG. 8 illustrates a method 800 of setting a NAV in accordance with some embodiments. Illustrated in FIG. 8 is time 802 along a horizontal axis, frequency 804 along a vertical axis, NAV duration 806 of the CTS/MU-CTS 810, HEW STA 104, trigger frame 812, MU LT transmission 814, master station 102, and HEW STA 104. The method 800 may begin with the master station 102 transmitting a RTS/MU-RTS 808. The RTS/MU-RTS 808 may be an indication for the HEW station 104 to transmit CTS/MU-CTS 810 with NAV duration 806 to time 816. The trigger frame 812 may be combined with the RTS/MU-RTS 808.

The method 800 continues with the HEW STA 104 transmitting the CTS/MU-CTS 810 with an indication that other wireless devices should set their NAV to NAV duration 806. In some embodiments, the NAV duration 806 may include a bandwidth. In some embodiments, the HEW STA 104 may transmit the CTS/MU-CTS 810 on multiple channels.

The method 800 continues with the master station 102 transmitting the trigger frame 812. The trigger frame 812 may include a resource allocation for the HEW STA 104. The method 800 continues with the HEW STA 104 determining whether or not to transmit the MU UL transmission 814 in accordance with the resource allocation. In some embodiments, the HEW STA 104 will transmit the MU UL transmission 814 if the HEW STA 104 transmitted the CTS/MU-CTS 810 with the NAV duration 806 that at least includes the MU UL transmission 814.

Figure 9:
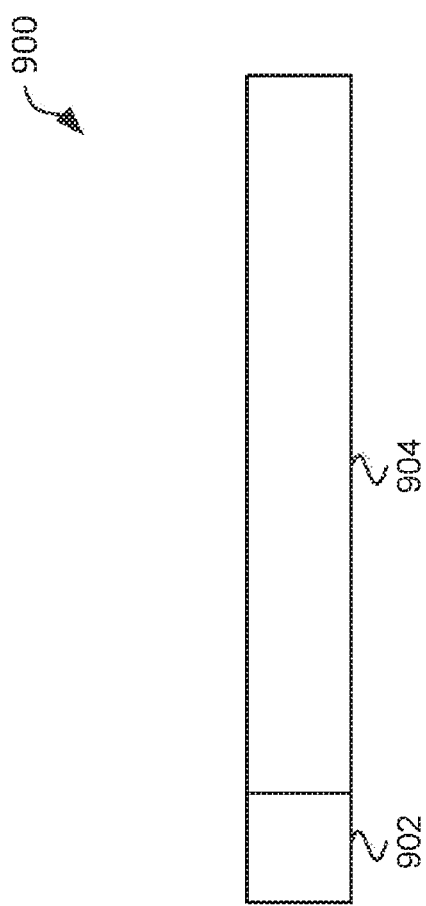
FIG. 9 illustrates a trigger frame in accordance with some embodiments.

FIG. 9 illustrates a trigger frame 900 in accordance with some embodiments. The trigger frame 900 may be a frame that indicates the start of a TXOP. The trigger frame 900 may comprise an indication 902 if a HEW station 104 or HEW stations 104 should consider the NAV before responding to the trigger frame 900. The indication 902 may be part of a PHY header or a MAC header. The indication 902 may include an association identification (AID) of one or more HEW stations 104 to indicate that the HEW station 104 should not consider the NAV when responding. The indication 902 may include a group indication to indicate that none of the member of the group should consider their respective NAVs when responding to the trigger frame 900. The indication 902 may include a single indication that indicates that the HEW stations 104 in the TXOP should not consider their NAV when responding to the trigger frame 900. The trigger frame 900 may include a portion 904 that may include a resource allocation for the HEW stations 104.

Figure 10:
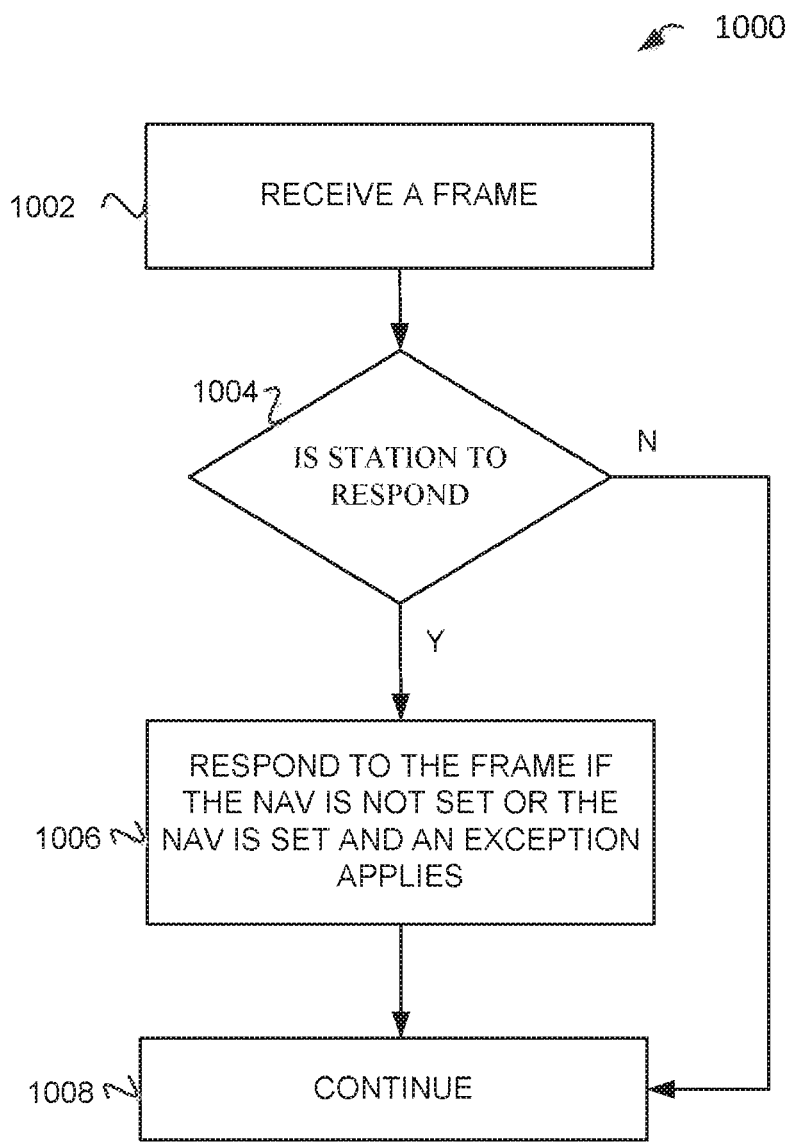
FIG. 10 illustrates a method of setting a NAV in accordance with some embodiments.

FIG. 10 illustrates a method 1000 of setting a NAV in accordance with some embodiments. The method 1000 begins at operation 1002 with receiving a frame. For example, a HEW station 104 may receive trigger frame 212, frame 506, frame 608, trigger frame 708, RTS/MU-RTS 808, trigger frame 812, or trigger frame 900. The method 1000 continues at operation 1004 with is the station to respond. For example, if the HEW station 104 is to respond to a trigger frame 212 then the method 1000 continues to operation 1006 with responding to the frame if the NAV is not set or the NAV is set and an exception applies. For example, if the NAV is not set then the HEW station 104 may reply to the frame. If the NAV is set, then the HEW station 104 may still reply under one of the following exceptions: (1) if the BW 514 of the NAV 512 indicates the HEW station 104 is to reply on a different bandwidth than the BW 514; (2) if the HEW station 104 is only to transmit an ACK/BA 610, and in some embodiments the ACK/BA 610 is below a threshold duration; (3) if an overlapping duration 714 is below a threshold; (4) if the HEW station 104 has already sent a CTS/MU-CTS 810 with a NAV duration 806 that includes the duration of the transmission of the HEW station 104; and, (5) if a trigger frame indication 902 indicates the HEW station 104 may ignore the NAV.

The method 1000 may continue at operation 1008 with continuing. The method 1000 may continue at operation 1008 from operation 1004 if the station is not to respond to the frame.

Figure 11:
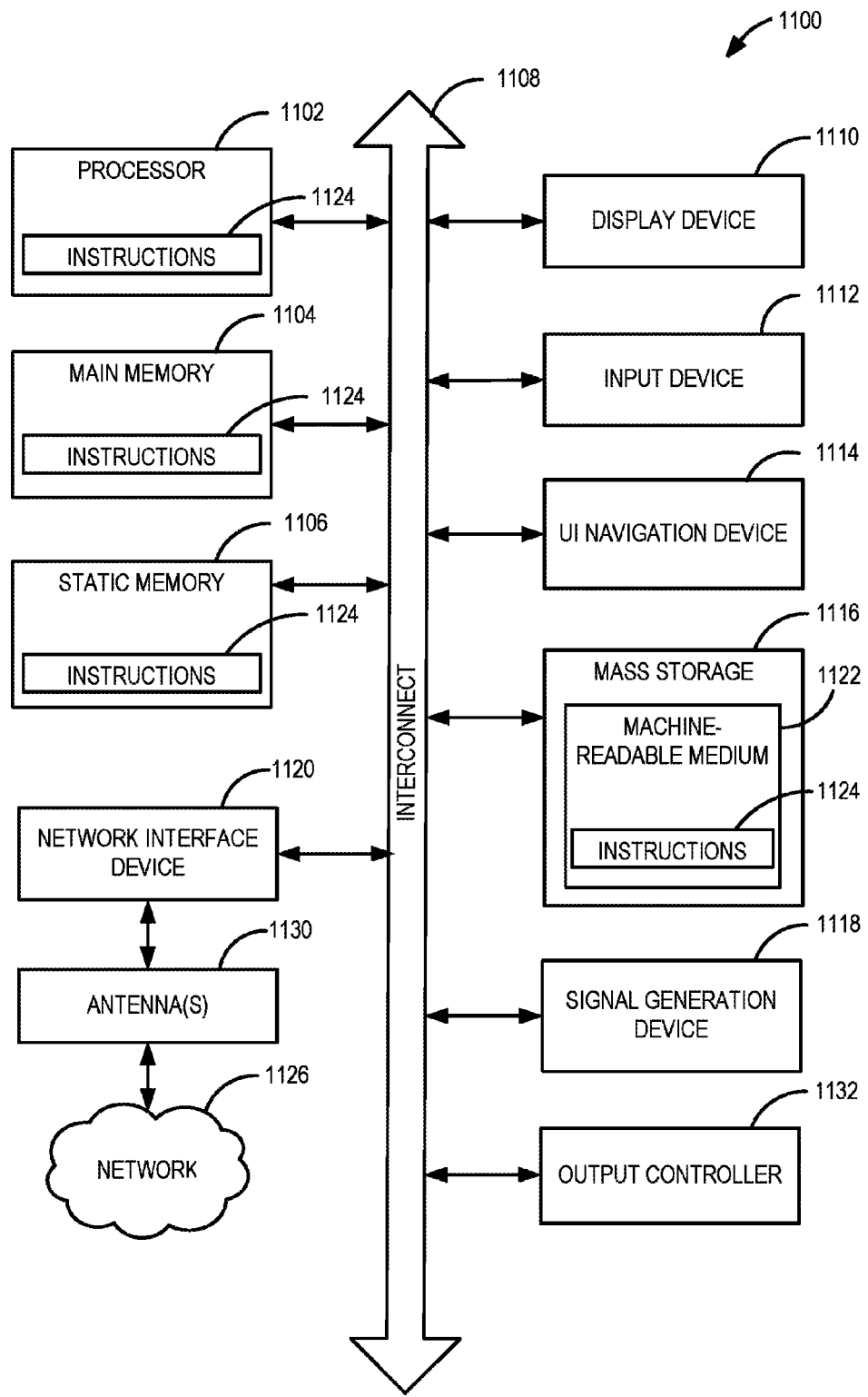
FIG. 11 illustrates a block diagram of an example machine upon which any one or more of the techniques (e.g., methodologies) discussed herein may perform.

FIG. 11 illustrates a block diagram of an example machine 1100 upon which any one or more of the techniques (e.g., methodologies) discussed herein may perform. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a master station 102 and/or HEW station 104, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1100 may include a hardware processor 1102 (e.g., a central processing unit (CPU), a graphics processing unit (CPU), a hardware processor core, or any combination thereof), a main memory 1104 and a static memory 1106, some or all of which may communicate with each other via an interlink (e.g., bus) 1108. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media. The processor 1102 may include processing circuitry and/or transceiver circuitry. In some embodiments, the processing circuitry and/or transceiver circuitry is implemented partially or wholly by the instructions 1124.

While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi® IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MEMO), or multiple-input single-output (MISO) techniques. In some examples, the network interface device 1120 may wirelessly communicate using Multiple User MIMO techniques. The term "transmission medium" shall be taken to include any intangible medium that is capable of storing, encoding or carrying instructions for execution by the machine 1100, and includes digital or analog communications signals or other intangible medium to facilitate communication of such software.

The following examples pertain to further embodiments. Example 1 is an apparatus of a station comprising memory and processing circuitry coupled to the memory, the processing circuitry configured to: decode a first frame of a wireless transmission, the frame comprising a first duration and a first transmitter address, if the first frame is a trigger frame or a multi-user request-to-send (MU-RTS) frame from a master station of a basic service set (BSS), respond to the trigger frame or the MU-RTS frame if the trigger frame or MU-RTS frame comprises an indicator that indicates not to consider a network allocation vector (NAV).

In Example 2, the subject matter of Example 1 can optionally include where the indication is one from the following group: an indication in a physical header and an indication in a media access control header.

In Example 3, the subject matter of Examples 1 or 2 can optionally include where the processing circuitry is further configured to: decode a second frame of a wireless transmission comprising a second duration and a second transmitter address; determine if the NAV is to be set based on the second frame, wherein the NAV comprises an indication of a bandwidth of the NAV; and if the NAV is to be set, then set the NAV to the second duration, wherein if a physical (PHY) header or a media access control (MAC) header of the second frame indicates a bandwidth of the NAV, then set the bandwidth of the NAV to the bandwidth of the NAV indicated by the PRY header or the MAC header otherwise set the bandwidth to an entire bandwidth occupied by the trigger frame or MU-RTS frame.

In Example 4, the subject matter of Example 3 can optionally include where the first frame is the trigger frame or the MU-RTS frame and wherein the first frame comprises a resource allocation with a second duration and second bandwidth for the station, and where the processing circuitry is further configured to: determine a first throughput by multiplying the second duration with the second bandwidth and determine a second throughput by multiplying the bandwidth of the NAV with a duration of the NAV, encode a third packet for the resource allocation if the second throughput is less than the first throughput by a threshold value.

In Example 5, the subject matter of Example 3 can optionally include where the processing circuitry is further configured to: respond to the trigger frame if the resource allocation of the trigger frame indicates a subchannel that does not overlap with the NAV bandwidth.

In Example 6, the subject matter of any of Examples 1-5 can optionally include where the first frame is the trigger frame or the MU-RTS frame and comprises a resource allocation with a second duration for the station, and wherein the processing circuitry is further configured to: determine an overlapping duration of the NAV with the second duration; and encode a third packet for the resource allocation if the overlapping duration is less than a threshold.

In Example 7, the subject matter of Example 6 can optionally include where the processing circuitry is further configured to: receive the threshold from the master station.

In Example 8, the subject matter of any of Examples 1-7 can optionally include where decode the first frame, decode a second frame, wherein the second frame is the MU-RTS; cause to be transmitted a multi-user clear-to-send (MU-CTS) comprising a duration for other wireless devices to defer in accordance with the MU-RTS; and if the first frame is the trigger frame and the trigger frame comprises a resource allocation within the duration, then respond to the trigger frame if the NAV is set or if the NAV is not set.

In Example 9, the subject matter of any of Examples 1-8 can optionally include where the frame further comprises an indication for the station to respond with an acknowledgement (ACK) or block ACK (BA), and wherein the processing circuitry is further configured to: respond with the ACK or BA if the NAV is set or if the NAV is not set.

In Example 10, the subject after of Example 9 can optionally include where the processing circuitry is further configured to: respond with the ACK or BA if a duration of the ACK or BA is below a threshold.

In Example 11, the subject matter of any of Examples 1-10 can optionally include where the apparatus is one from the following group: a station, an access point, an Institute of Electrical and Electronic Engineers (IEEE) 802.11ax access point, an IEEE 802.11ax station, and an IEEE station, and an IEEE access point.

In Example 12, the subject matter of any of Examples 1-11 can optionally include where the processing circuitry is configured to: decode the first frame and respond to the frame in accordance with orthogonal frequency division multiple-access (OFDMA) and multiple-user multiple-input multiple-output (MU-MIMO).

In Example 13, the subject matte of any of Examples 1-12 can optionally include one or more antennas coupled to the processing circuitry.

Example 14 is a non-transitory computer-readable storage medium that stores instructions for execution by one or more processors, the instructions to configure the one or more processors to cause an apparatus to: decode a first frame of a wireless transmission, the frame comprising a first duration and a first transmitter address; if the first frame is a trigger frame or a multi-user request-to-send (MU-RTS) frame from a master station of a basic service set (BSS), respond to the trigger frame or the MU-RTS frame if the trigger frame or MU-RTS frame comprises an indicator that indicates not to consider a network allocation vector (NAV).

In Example 15, the subject matter of Examples 14 can optionally include where the indication is one from the following group: an indication in a physical header and an indication in a media access control header.

In Example 16, the subject matter of Examples 14 or 15 can optionally include where the instructions configure the one or more processors to cause the station to: decode a second frame of a wireless transmission comprising a second duration and a second transmitter address; determine if the NAV is to be set based on the second frame, wherein the NAV comprises an indication of a bandwidth of the NAV; and if the NAV is to be set, then set the NAV to the second duration, wherein if a physical (PHY) header or a media access control (MAC) header of the second frame indicates a bandwidth of the NAV, then set the bandwidth of the NAV to the bandwidth of the NAV indicated by the PHY header or the MAC header otherwise set the bandwidth to an entire bandwidth occupied by the trigger frame or MU-RTS frame.

In Example 17, the subject matter of any of Examples 14-16 can optionally include where the first frame is the trigger frame or the MU-RTS frame and wherein the first frame comprises a resource allocation with a second duration and second bandwidth for the station, and wherein the instructions configure the one or more processors to cause the station to: determine a first throughput by multiplying the second duration with the second bandwidth and determine a second throughput by multiplying the bandwidth of the NAV with a duration of the NAV; encode a third packet for the resource allocation if the second throughput is less than the first throughput by a threshold value.

In Example 18, the subject matter of any of Examples 14-17 can optionally include where the instructions configure the one or more processors to cause the station to: decode the first frame, decode a second frame, wherein the second frame is the MU-RTS; cause to be transmitted a multi-user clear-to-send (MU-CTS) comprising a duration for other wireless devices to defer in accordance with the MU-RTS; and if the first frame is the trigger frame and the trigger frame comprises a resource allocation within the duration, then respond to the trigger frame if the NAV is set or if the NAV is not set.

In Example 19, the subject matter of any of Examples 14-18 can optionally include where the first frame further comprises an indication for the station to respond with an acknowledgement (ACK) or block ACK (BA), and wherein the instructions configure the one or more processors to cause the station to: respond with the ACK or BA if the NAV is set or if the NAV is not set.

Example 20 is an apparatus of an access point comprising memory and processing circuitry coupled to the memory, the processing circuitry configured to: encode a trigger frame or a multi-user request-to-send (MU-RTS) frame comprising a first duration and a network allocation vector (NAV) indicator that indicates that one or more stations are not to consider a NAV of the one or more stations.

In Example 21, the subject matter of Example 20 can optionally include where the indication is one from the following group: an indication in a physical header and an indication in a media access control header.

In Example 22, the subject matter of Examples 20 or 21 can optionally include where the processing circuitry is further configured to: encode a second frame comprising a second duration and a bandwidth that indicates the one or more stations are to set their respective NAVs with the second duration associated with the bandwidth.

In Example 23, the subject matter of any of Examples 20-22 can optionally include one or more antennas coupled to the processing circuitry.

Example 24 is a method performed by an apparatus, the method comprising: decoding a frame comprising a first duration and a first transmitter address; if the frame is a trigger frame or a multi-user request-to-send (MU-RTS) frame from a master station of a basic service set (BSS), responding to the trigger frame or the MU-RTS frame if the trigger frame or MU-RTS frame comprises an indicator that indicates not to consider a network allocation vector (NAV).

In Example 25, the subject matter of Example 25 can optionally include where the indication is one from the following group: an indication in a physical header and an indication in a media access control header.

Example 26 is an apparatus comprising: means for decoding a first frame of a wireless transmission, the frame comprising a first duration and a first transmitter address; if the first frame is a trigger frame or a multi-user request-to-send (MU-RTS) frame from a master station of a basic service set (BSS), means for responding to the trigger frame or the MU-RTS frame if the trigger frame or MU-RTS frame comprises an indicator that indicates not to consider a network allocation vector (NAV).

In Example 27, the subject matter of Examples 26 can optionally include where the indication is one from the following group: an indication in a physical header and an indication in a media access control header.

In Example 28, the subject matter of any of Examples 26-27 can optionally include means for decoding a second frame of a wireless transmission comprising a second duration and a second transmitter address; means for determining if the NAV is to be set based on the second frame, wherein the NAV comprises an indication of a bandwidth of the NAV; and if the NAV is to be set, then means for setting the NAV to the second duration, wherein if a physical (PHY) header or a media access control (MAC) header of the second frame indicates a bandwidth of the NAV, then means for setting the bandwidth of the NAV to the bandwidth of the NAV indicated by the PHY header or the MAC header otherwise set the bandwidth to an entire bandwidth occupied by the trigger frame or MU-RTS frame.

In Example 29, the subject matter of Example 28 can optionally include where wherein the first frame is the trigger frame or the MU-RTS frame and wherein the first frame comprises a resource allocation with a second duration and second bandwidth for the station, and wherein the processing circuitry is further configured to means for determining a first throughput by multiplying the second duration with the second bandwidth and determine a second throughput by multiplying the bandwidth of the NAV with a duration of the NAV; means for encoding a third packet for the resource allocation if the second throughput is less than the first throughput by a threshold value.

In Example 30, the subject matter of Examples 28 can optionally include means for responding to the trigger frame if a resource allocation in the trigger frame indicates a subchannel that does not overlap with the NAV bandwidth.

In Example 31, the subject matter of any of Examples 26-30 can optionally include where the frame is the trigger frame or the MU-RTS frame and wherein the frame comprises a resource allocation with a second duration for the station, and further comprising: means for determining an overlapping duration of the NAV with the second duration; and means for encoding a third packet for the resource allocation if the overlapping duration is less than a threshold.

In Example 32, the subject matter of Example 31 can optionally include means for receiving the threshold from the master station.

In Example 33, the subject matter of any of Examples 26-32 can optionally include means for decoding the first frame, decode a second frame, wherein the second frame is the MU-RTS; means for causing to be transmitted a multi-user clear-to-send (MU-CTS) comprising a duration for other wireless devices to defer in accordance with the MU-RTS; and if the first frame is the trigger frame and the trigger frame comprises a resource allocation within the duration, then means for responding to the trigger frame if the NAV is set or if the NAV is not set.

In Example 34, the subject matter of any of Examples 26-33 can optionally include where the frame further comprises an indication for the station to respond with an acknowledgement (ACK) or block ACK (BA), and further comprising: means for responding with the ACK or BA if the NAV is set or if the NAV is not set.

In Example 35, the subject matter of Example 34 can optionally include means for responding with the ACK or BA if a duration of the ACK or BA is below a threshold.

In Example 36, the subject matter of any of Examples 26-35 can optionally include where the apparatus is one from the following group: a station, an access point, an Institute of Electrical and Electronic Engineers (IEEE) 802.11ax access point, an IEEE 802.11ax station, and an IEEE station, and an IEEE access point.

In Example 37, the subject matter of any of Examples 26-36 can optionally include means for decoding the first frame and responding to the first frame in accordance with orthogonal frequency division multiple-access (OFDMA) and multiple-user multiple-input multiple-output (MU-MIMO).

In Example 38, the subject matter of any of Examples 26-37 can optionally include means for transmitting and receiving radio signals.

Example 39 is an apparatus comprising: means for encoding a trigger frame or a multi-user request-to-send (MU-RTS) frame comprising a first duration and a network allocation vector (NAV) indicator that indicates that one or more stations are not to consider a NAV of the one or more stations.

In Example 40, the subject matter of Example 39 can optionally include where the indication is one from the following group: an indication in a physical header and an indication in a media access control header.

In Example 41, the subject matter of Examples 39 or 40 can optionally include means for encoding a second frame comprising a second duration and a bandwidth that indicates the one or more stations are to set their respective NAVs with the second duration associated with the bandwidth.

In Example 42, the subject matter of any of Examples 39-41 can optionally include means for transmitting and receiving radio signals.

Example 43 is a method performed by an apparatus, the method comprising: encoding a trigger frame or a multi-user request-to-send (MU-RTS) frame comprising a first duration and a network allocation vector (NAV) indicator that indicates that one or more stations are not to consider a NAV of the one or more stations. The apparatus may be an access point or station.

In Example 44, the subject matter of Example 43 can optionally include where the indication is one from the following group: an indication in a physical header and an indication in a media access control header.

In Example 45, the subject matter of Examples 43 or 44 can optionally include encoding a second frame comprising a second duration and a bandwidth that indicates the one or more stations are to set their respective NAVs with the second duration associated with the bandwidth.

Example 46 is a non-transitory computer-readable storage medium that stores instructions for execution by one or more processors, the instructions to configure the one or more processors to cause an apparatus to: encode a trigger frame or a multi-user request-to-send (MU-RTS) frame comprising a first duration and a network al location vector (NAV) indicator that indicates that one or more stations are not to consider a NAV of the one or more stations.

In Example 47, the subject matter of Example 46 can optionally include where the indication is one from the following group: an indication in a physical header and an indication in a media access control header.

In Example 48, the subject matter of Examples 46 or 47 can optionally include where the instructions configure the one or more processors to cause the access point to: encode a second frame comprising a second duration and a bandwidth that indicates the one or more stations are to set their respective NAVs with the second duration associated with the bandwidth.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station comprising: memory; and, processing circuitry coupled to the memory, the processing circuitry configured to:
   decode a first frame of a wireless transmission, the first frame comprising a first duration;
   if the first frame is a trigger frame or a multi-user request-to-send (MU-RTS) frame from an access point of a same basic service set (BSS) as the station, respond to the trigger frame or the MU-RTS frame if a network allocation vector (NAV) of the station is not set, or respond to the trigger frame or the MU-RTS frame if the NAV of the station is set and the trigger frame or MU-RTS frame comprises an indicator that indicates not to consider the NAV;
   decode a second frame comprising a second duration; and
   in response to a determination that the NAV is to be set based on the second frame, set the NAV to the second duration, and if a physical (PHY) header or a media access control (MAC) header of the second frame indicates a bandwidth of the NAV, then set the bandwidth of the NAV to the bandwidth of the NAV indicated by the PHY header or the MAC header otherwise set the bandwidth to an entire bandwidth occupied by the second frame.

2. The apparatus of claim 1, wherein the indication is one from the following group: an indication in a PHY header and an indication in a MAC header.

3. The apparatus of claim 1, wherein the first frame is the trigger frame or the MU-RTS frame and wherein the first frame comprises a resource allocation with a second duration and second bandwidth for the station, and wherein the processing circuitry is further configured to:
   determine a first throughput by multiplying the second duration with the second bandwidth and determine a second throughput by multiplying the bandwidth of the NAV with a duration of the NAV; and
   encode a third packet for the resource allocation if the second throughput is less than the first throughput by a threshold value.

4. The apparatus of claim 3, wherein the processing circuitry is further configured to:
   respond to the trigger frame if the resource allocation of the trigger frame indicates a subchannel that does not overlap with the NAV bandwidth.

5. The apparatus of claim 1, wherein the first frame is the trigger frame or the MU-RTS frame and comprises a resource allocation with a second duration for the station, and wherein the processing circuitry is further configured to:
   determine an overlapping duration of the NAV with the second duration; and
   encode a third packet for the resource allocation if the overlapping duration is less than a threshold.

6. The apparatus of claim 5, wherein the processing circuitry is further configured to:
   receive the threshold from the access point.

7. The apparatus of claim 1, wherein the processing circuitry is further configured to:
   decode the first frame, decode a second frame, wherein the second frame is the MU-RTS;
   cause to be transmitted a multi-user clear-to-send (MU-CTS) comprising a duration for other wireless devices to defer in accordance with the MU-RTS; and
   if the first frame is the trigger frame and the trigger frame comprises a resource allocation within the duration, then respond to the trigger frame if the NAV is set or if the NAV is not set.

8. The apparatus of claim 1, wherein the first frame further comprises an indication for the station to respond with an acknowledgement (ACK) or block ACK (BA), and wherein the processing circuitry is further configured to:
   respond with the ACK or BA if the NAV is set or if the NAV is not set.

9. The apparatus of claim 8, wherein the processing circuitry is further configured to:
   respond with the ACK or BA if a duration of the ACK or BA is below a threshold.

10. The apparatus of claim 1, wherein the station is one from the following group: an access point, an Institute of Electrical and Electronic Engineers (IEEE) 802.11 ax access point, an IEEE 802.11 ax station, an IEEE station, and an IEEE access point.

11. The apparatus of claim 1, wherein the processing circuitry is configured to:
   decode the first frame and respond to the first frame in accordance with one or both of orthogonal frequency division multiple-access (OFDMA) or multiple-user multiple-input multiple-output (MU-MIMO).

12. The apparatus of claim 1, further comprising one or more antennas coupled to the processing circuitry.

13. A non-transitory computer-readable storage medium that stores instructions for execution by one or more processors of an apparatus of a station, the instructions to configure the one or more processors to:
   decode a first frame of a wireless transmission, the first frame comprising a first duration;
   if the first frame is a trigger frame or a multi-user request-to-send (MU-RTS) frame from an access point of a same basic service set (BSS) as the station, respond to the trigger frame or the MU-RTS frame if a network allocation vector (NAV) of the station is not set, or respond to the trigger frame or the MU-RTS if the NAV of the station is set and the trigger frame or MU-RTS frame comprises an indicator that indicates not to consider the NAV;
   decode a second frame comprising a second duration; and
   in response to a determination that the NAV is to be set based on the second frame, set the NAV to the second duration, and if a physical (PHY) header or a media access control (MAC) header of the second frame indicates a bandwidth of the NAV, then set the bandwidth of the NAV to the bandwidth of the NAV indicated by the PHY header or the MAC header otherwise set the bandwidth to an entire bandwidth occupied by the second frame.

14. The non-transitory computer-readable storage medium of claim 13, wherein the indication is one from the following group: an indication in a PHY header and an indication in a MAC header.

15. The non-transitory computer-readable storage medium of claim 13, wherein the first frame is the trigger frame or the MU-RTS frame and wherein the first frame comprises a resource allocation with a second duration and second bandwidth for the station, and wherein the instructions configure the one or more processors to:
   determine a first throughput by multiplying the second duration with the second bandwidth and determine a second throughput by multiplying the bandwidth of the NAV with a duration of the NAV; and encode a third packet for the resource allocation if the second throughput is less than the first throughput by a threshold value.

16. The non-transitory computer-readable storage medium of claim 13, wherein the instructions configure the one or more processors to:
    decode the first frame, decode a second frame, wherein the second frame is the MU-RTS;
    cause to be transmitted a multi-user clear-to-send (MU-CTS) comprising a duration for other wireless devices to defer in accordance with the MU-RTS; and
    if the first frame is the trigger frame and the trigger frame comprises a resource allocation within the duration, then respond to the trigger frame if the NAV is set or if the NAV is not set.

17. The non-transitory computer-readable storage medium of claim 13, wherein the first frame further comprises an indication for the station to respond with an acknowledgement (ACK) or block ACK (BA), and wherein the instructions configure the one or more processors to cause the station to:
    respond with the ACK or BA if the NAV is set or if the NAV is not set.

18. An apparatus of an access point, the apparatus comprising memory; and, processing circuitry coupled to the memory, the processing circuitry configured to:
    encode a trigger frame or a multi-user request-to-send (MU-RTS) frame comprising a first duration field and a network allocation vector (NAV) indicator that indicates that one or more stations are not to consider a NAV of the one or more stations;
    configure the apparatus to transmit the trigger frame to the one or more stations; and
    encode a second frame comprising a second duration field and a bandwidth field, wherein the bandwidth indicates the one or more stations are to set their respective NAVs with the second duration associated with the bandwidth.

19. The apparatus of claim 18, wherein the bandwidth field is in a physical header or a media access control header.

20. The apparatus of claim 18, further comprising one or more antennas coupled to the processing circuitry.

21. A method performed by an apparatus of a station, the method comprising:
    decode a first frame of a wireless transmission, the first frame comprising a first duration;
    if the first frame is a trigger frame or a multi-user request-to-send (MU-RTS) frame from an access point of a same basic service set (BSS) as the station, responding to the trigger frame or the MU-RTS frame if a network allocation vector (NAV) of the station is not set, or responding to the trigger frame or the MU-RTS frame if the NAV of the station is set and the trigger frame or MU-RTS frame comprises an indicator that indicates not to consider the NAV;
    decode a second frame comprising a second duration; and
    in response to a determination that the NAV is to be set based on the second frame, setting the NAV to the second duration, and if a physical (PHY) header or a media access control (MAC) header of the second frame indicates a bandwidth of the NAV, then setting the bandwidth of the NAV to the bandwidth of the NAV indicated by the PHY header or the MAC header otherwise setting the bandwidth to an entire bandwidth occupied by the second frame.

22. The method of claim 21, wherein the indication is one from the following group: an indication in a PHY header and an indication in a MAC header.

* * * * *